(12) United States Patent
Rich

(10) Patent No.: US 10,744,831 B2
(45) Date of Patent: Aug. 18, 2020

(54) WALKING AXLE FOR A SPREADER SPRAYER MACHINE

(71) Applicant: THE TORO COMPANY, Bloomington, MN (US)

(72) Inventor: Thomas M. Rich, Lebanon, IN (US)

(73) Assignee: THE TORO COMPANY, Bloomington, MN (US)

( * ) Notice: Subject to any disclaimer, the term of this patent is extended or adjusted under 35 U.S.C. 154(b) by 37 days.

(21) Appl. No.: 16/160,722

(22) Filed: Oct. 15, 2018

(65) Prior Publication Data

US 2020/0114715 A1  Apr. 16, 2020

(51) Int. Cl.
*B60G 5/04* (2006.01)
*B60B 37/00* (2006.01)

(52) U.S. Cl.
CPC ............ *B60G 5/04* (2013.01); *B60B 37/00* (2013.01); *B60G 2200/318* (2013.01); *B60G 2300/08* (2013.01)

(58) Field of Classification Search
CPC .......... B60G 2300/08; B60G 2200/318; B60B 37/00
See application file for complete search history.

(56) References Cited

U.S. PATENT DOCUMENTS

| | | | |
|---|---|---|---|
| 2,745,503 A | 5/1956 | Fisher | |
| 3,485,314 A * | 12/1969 | Herr | B60P 9/00 180/19.1 |
| 3,488,061 A * | 1/1970 | Hansen | A01M 7/0082 280/479.1 |
| 5,052,627 A | 10/1991 | Balmer | |
| 5,562,172 A * | 10/1996 | Mick | B60G 5/02 180/24.02 |
| 5,655,615 A | 8/1997 | Mick | |
| 5,809,914 A * | 9/1998 | Follmer | A01B 51/04 111/56 |
| 6,336,600 B1 * | 1/2002 | Jessen | A01C 7/06 239/155 |
| 6,339,917 B1 | 1/2002 | Dillon et al. | |
| 6,454,294 B1 | 9/2002 | Bittner et al. | |

(Continued)

OTHER PUBLICATIONS

Kasco Manufacturing Co., Inc., "Landscapers Choice Primary Seeder". Retrieved from the Internet at: <URL: https://kascomfg.com/drillsseeders/landscapers-choice-primary-seeder> (2018).

*Primary Examiner* — John D Walters
*Assistant Examiner* — James J Triggs
(74) *Attorney, Agent, or Firm* — Marshall, Gerstein & Borun LLP

(57) ABSTRACT

A spreader sprayer system includes a frame member defining a frame body that has a first side, a second side, a front portion, and a rear portion, a first walking member pivotably coupled to the first side of the frame body, a second walking member pivotably coupled to the second side, a first and second plurality of drive wheels, and at least one spray container. The first plurality of drive wheels are disposed on the first side of the frame body and are operatively coupled to the first walking member. The second plurality of drive wheels are disposed on the second side of the frame body and are operatively coupled to the second walking member. Each spray container is coupled to at least one of the first walking member or the second walking member.

15 Claims, 10 Drawing Sheets

(56) References Cited

U.S. PATENT DOCUMENTS

| | | | | |
|---|---|---|---|---|
| 7,178,824 | B2* | 2/2007 | Ziech | B60G 5/053 |
| | | | | 280/678 |
| 7,562,727 | B1 | 7/2009 | Hoffart | |
| 8,056,828 | B1* | 11/2011 | Kline | A01C 17/005 |
| | | | | 239/147 |
| 8,261,845 | B2 | 9/2012 | Palen | |
| 8,262,101 | B2* | 9/2012 | Madler | B60G 21/023 |
| | | | | 180/24.11 |
| D673,586 | S * | 1/2013 | Truan | D15/13 |
| 9,623,903 | B2* | 4/2017 | Cook | B62D 7/08 |
| 9,828,047 | B2 | 11/2017 | Eavenson, Sr. et al. | |
| 9,884,662 | B2 | 2/2018 | Eavenson, Sr. et al. | |
| 2003/0140610 | A1 | 7/2003 | Boyko | |
| 2007/0084946 | A1* | 4/2007 | Neville | A01C 23/047 |
| | | | | 239/172 |
| 2010/0003872 | A1* | 1/2010 | Jessen | B60F 3/0007 |
| | | | | 440/12.5 |
| 2016/0122957 | A1* | 5/2016 | Schattinger | E01H 1/0854 |
| | | | | 15/340.4 |
| 2018/0338413 | A1* | 11/2018 | Connell | A01C 7/208 |

* cited by examiner

WALKING AXLE FOR A SPREADER SPRAYER MACHINE

FIELD OF THE DISCLOSURE

The present disclosure generally relates to outdoor power equipment and, more particularly, to equipment for dispensing fertilizers.

BACKGROUND

Proper fertilization equipment can assist in improving and maintaining the quality of outdoor landscaping and turf, and can increase agricultural yields. While fertilizer can be dispensed by hand, such a process may have a number of shortcomings such as an increased time required to apply the fertilizer, a lack of uniformity in the quantity of fertilizer dispensed to a given area, and the like. Accordingly, spreader sprayer machines can be used to assist in dispensing the fertilizer. However, even when using spreader sprayer machines, rough and/or uneven landscaping environments can result in uneven dispersion of fertilizer. Additionally, uneven terrain can cause these machines to become unbalanced and unstable, and thus can result in an unpleasant user experience.

SUMMARY

In accordance with a first aspect, a spreader sprayer system includes a frame member defining a frame body that has a first side, a second side, a front portion, and a rear portion, a first walking member pivotably coupled to the first side of the frame body, a second walking member pivotably coupled to the second side, first and second drive wheel assemblies, and at least one spray container. The first drive wheel assembly is disposed on the first side of the frame body and is operatively coupled to the first walking member. The second drive wheel assembly is disposed on the second side of the frame body and is operatively coupled to the second walking member. The spray containers are coupled to at least one of the first walking member or the second walking member.

In some examples, the spreader sprayer system further includes a first pivotable connection region disposed on the first side of the frame body and a second pivotable connection region disposed on the second side of the frame body. The first and second pivotable connection regions provide relative rotation between the frame body, the first walking member, and/or the second walking member.

In some forms, the system may additionally include any number of rotation limiters. For example, a first rotation limiter may be disposed on the first side of the frame member to selectively engage the first walking member, thereby limiting relative rotation between the frame member and the first walking member. Similarly, a second rotation limiter may be disposed on the second side of the frame member to selectively engage the second walking member, thereby limiting relative rotation between the frame member and the second walking member. The system may also include any number of stop tabs coupled to the walking members that engage the rotation limiters to limit relative rotation between the frame member and the walking members. In one approach, when the spreader sprayer system is disposed on a generally horizontal surface, the stop tab is disposed away from at least the first rotation limiter.

In some examples, the first drive wheel assembly includes a plurality of drive wheels which are operatively connected to each other such that the first plurality of drive wheels are driven at an identical rate of rotation. The first and/or the second drive wheel assembly may be driven by a motor.

In some approaches, the spreader sprayer system may additionally include a standing platform operatively coupled to the rear portion of the frame body, and further may include a spreader container operatively coupled to the front portion of the frame body.

In accordance with a second aspect, a walking beam assembly for a spreader sprayer system includes a first walking member having a first rotatable coupling, a first plurality of drive wheels being operatively coupled to the first walking member, and a first spray container. The first spray container is coupled to the first walking member such that the first spray container rotates with the first walking member about the first rotatable coupling.

BRIEF DESCRIPTION OF THE DRAWINGS

The above needs are at least partially met through provision of the walking axle for a spreader sprayer machine described in the following detailed description, particularly when studied in conjunction with the drawings, wherein.

Figure 1:
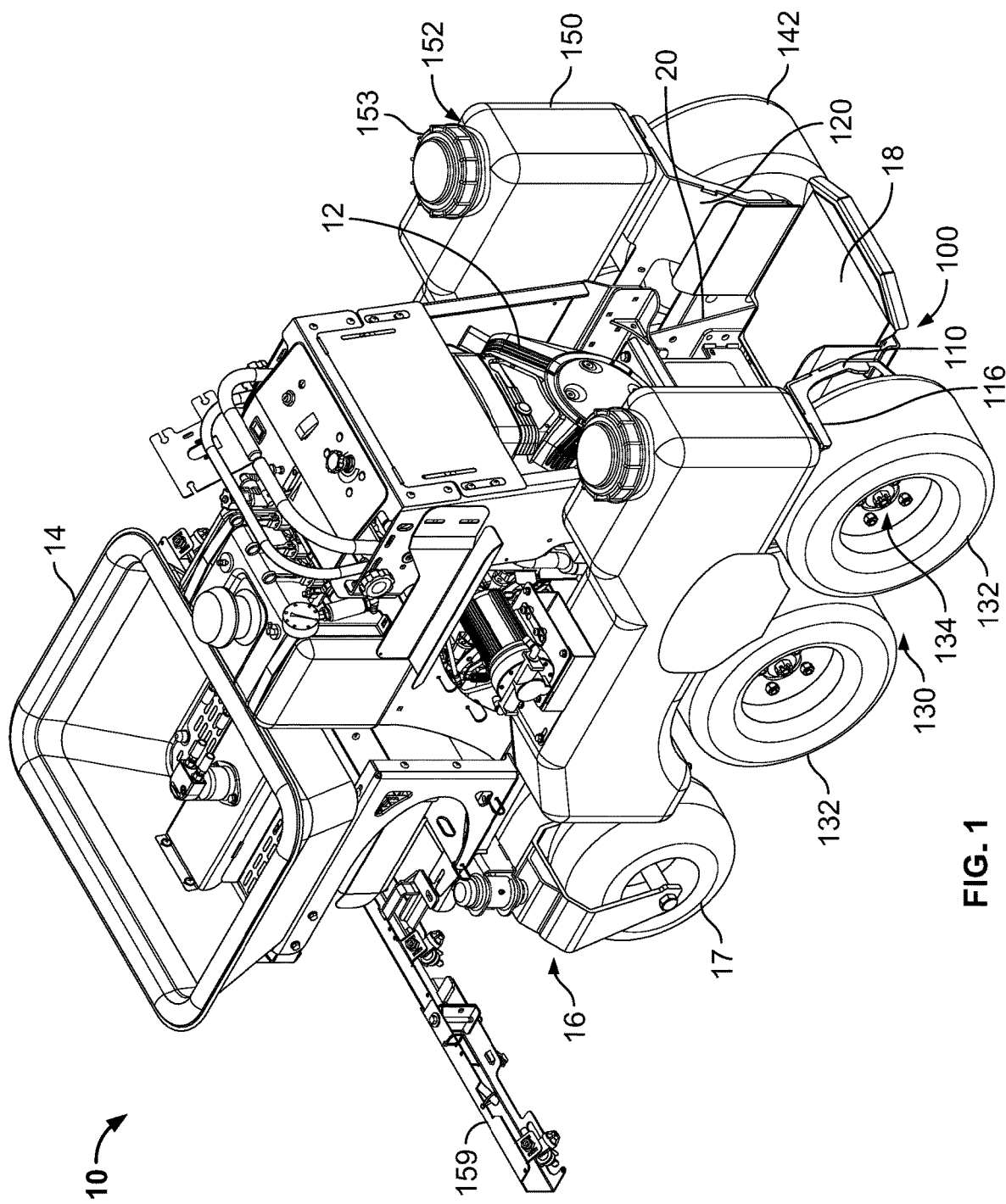
FIG. 1 illustrates a perspective view of an example spreader sprayer system having a walking beam assembly in accordance with various embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a spreader sprayer 10 is provided. The spreader sprayer 10 includes a number of subsystems that assist in traversing and applying wet and/or dry fertilization products to a landscape or terrain. For example, the spreader sprayer 10 may include a motor 12 for driving the spreader sprayer 10, a spreader container or hopper 14 to contain and distribute a dry fertilizer, a turning assembly 16 having a set of wheels 17 mounted thereto to assist in steering the spreader sprayer 10, and a standing platform 18, each of which is operably coupled to a main frame member 20. The spreader sprayer 10 further includes a walking beam assembly 100 (FIG. 5) to assist in traversing uneven terrain. It will be appreciated that the spreader sprayer 10 may include any number of additional components and/or assemblies to assist in traversing and applying a fertilizer to a terrain. The material to be distributed, referred to as a "fertilizer" herein, may be in granular or liquid form, and includes fertilizers, weed killers, insecticides, deicing material, herbicides, cleaners, seeds, etc.

The frame member 20 defines a frame body 22 having a first side 22a, a second side 22b, a front portion 22c, and a rear portion 22d. Generally, the motor 12 is positioned above and coupled to the frame body 22, the turning assembly 16 is coupled to the front portion 22c of the frame body 22, and the standing platform 18 is coupled to the rear portion 22d of the frame body 22. The hopper 14 may be operably coupled to the turning assembly 16 and/or the front portion 22c of the frame body 22. The frame body 22 further defines a first pivotable connection region 24 (FIG. 7) disposed on the first side 22a, and a second pivotable connection region 26 disposed on the second side 22b. In the illustrated example, both the first and second pivotable connection regions 24, 26 are in the form of a bore or opening that define a pivot axis "L" and accept a first and a second walking axle assembly 160. The frame member 20 may support any number of additional components and/or subsystems via mounting structures (e.g., holes, flanges, and/or other coupling mechanisms).

With reference to FIGS. 4-10, the walking beam assembly 100 includes the frame member 20, a first walking member 110, a second walking member 120, a first drive wheel assembly 130 having a first set of drive wheels, a second drive wheel assembly 140 having a second set of drive wheels, at least one spray container 150, and at least one walking axle assembly 160.

Figure 5:
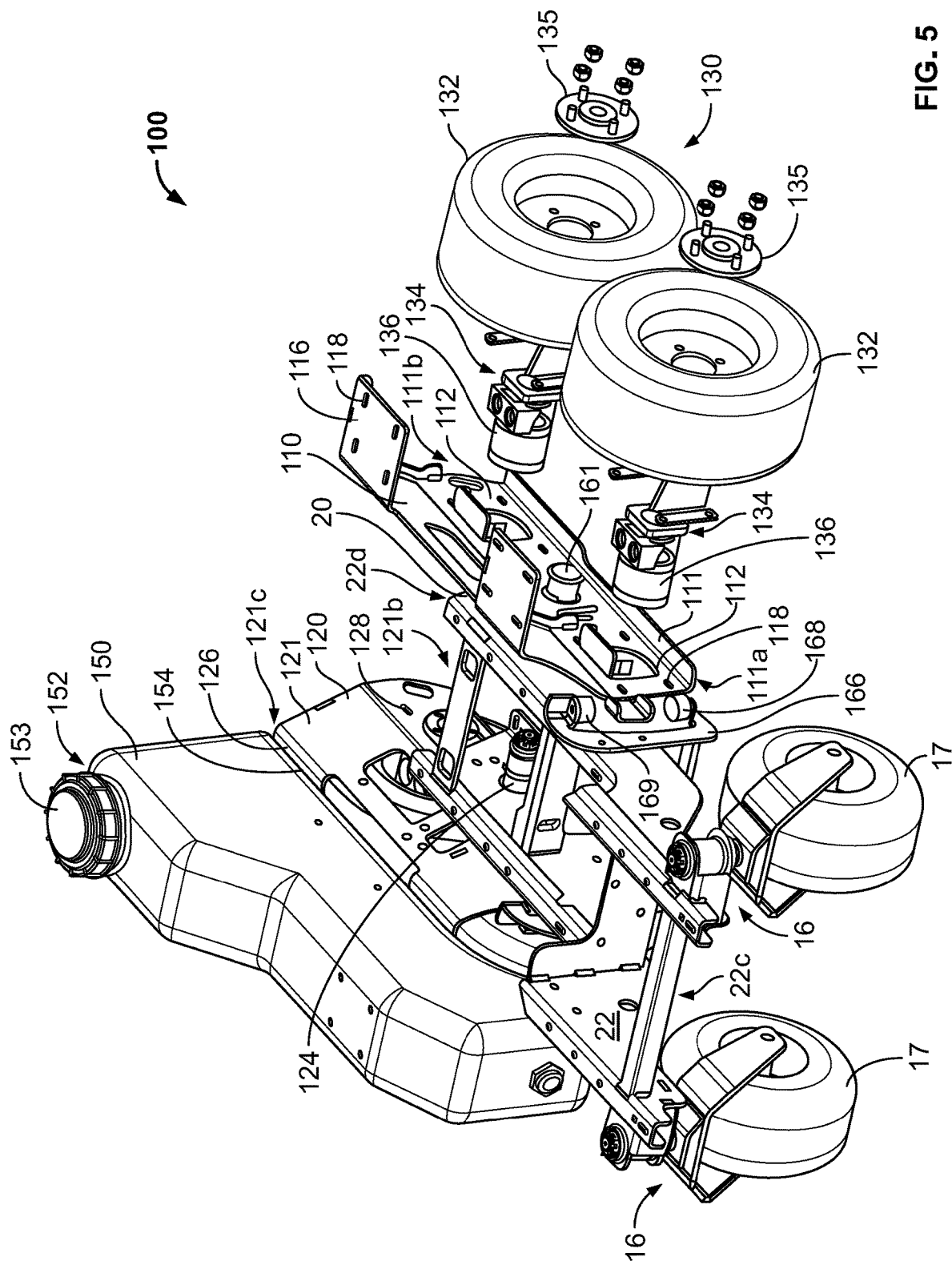
FIG. 5 illustrates a front-side exploded perspective view of the example walking beam assembly of FIG. 4 in accordance with various embodiments.
Figure 6:
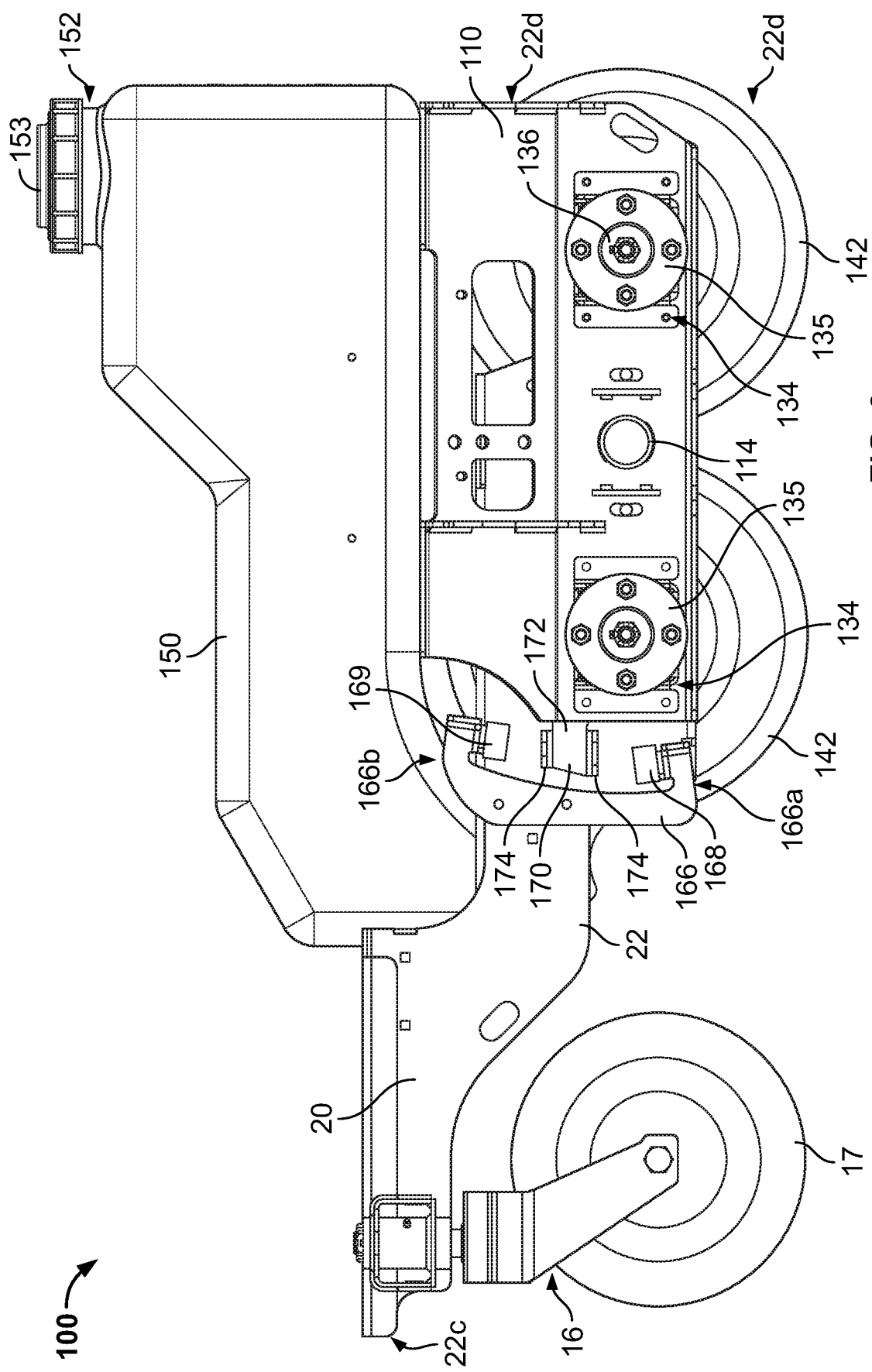
FIG. 6 illustrates a side elevation view of the example walking beam assembly of FIGS. 4 and 5 in accordance with various embodiments.

The first and the second walking members 110, 120 include similar features, and as such, the components will be described only with reference to the first walking member 110. However, it should be appreciated that the second walking member 120 may have any number of features described with reference to the first walking member 110, and thus these features will be annotated with the same one-digit suffix as the first walking member 110. As shown in FIG. 5, the first walking member 110 is defined by a walking member body or beam 111 in the form of an elongated shape having a front portion 111a, a rear portion 111b, an upper portion 111c, and a lower portion 111d. Positioned near the front portion 111a and the rear portion 111b of the first walking member 110 are openings 112, each being dimensioned to operably couple one of the first set of drive wheels 130 to the walking member 110. While the first set of drive wheels 130 in the illustrated example has two individual drive wheels, any number of drive wheels may be used.

The first walking member 110 further includes a pivot opening 114 (FIG. 7) disposed through the walking member body 111, and at least one flange or plate portion 116 disposed at the upper portion 111c of the walking member body 111. Further still, the first walking member 110 may include any number of mounting portions 118 in the form of mounting holes, slots, flanges, and/or brackets that allow components to be mounted and/or secured to the walking member body 111.

The first and the second drive wheel assemblies 130, 140 include similar features, and as such, the components will be described only with reference to the first drive wheel assembly 130. However, it should be appreciated that the second drive wheel assembly 140 may have any number of features described with reference to the first drive wheel assembly 130, and thus these features will be annotated with the same one-digit suffix as the first drive wheel assembly 130. The first drive wheel assembly 130 includes a plurality of drive wheels 132, each having a corresponding mounting assembly 134 that includes a wheel hub 135, a drive axle 136, and any other components such as bushings, bearings, brackets, plates, bolts, and the like required to secure and drive the drive wheels 132.

Each of the drive wheels 132 is operatively mounted to the walking member body 111 by inserting the drive axle 136 through the openings 112 formed in the walking member body 111 and securing the wheel hub 135 to the drive axle 136. As a result, each of the drive wheels 132 is rotatable relative to the walking member body 111. In some examples, the motor 12 is operably coupled to the first drive wheel assembly 130. In these examples, the motor 12 may be configured to drive each drive wheel 132 such that the drive wheels 132 have an identical rate of rotation. The motor 12 may also drive each drive wheel 142 of the second drive wheel assembly 140 in a way that causes the drive wheels 142 to have an identical rate of rotation. In some examples, the rate of rotation of the first and second drive wheel assemblies 130, 140 may be equal, and in some examples, the rate of rotation of the first and second drive wheel assemblies 130, 140 may be different.

Figure 2:
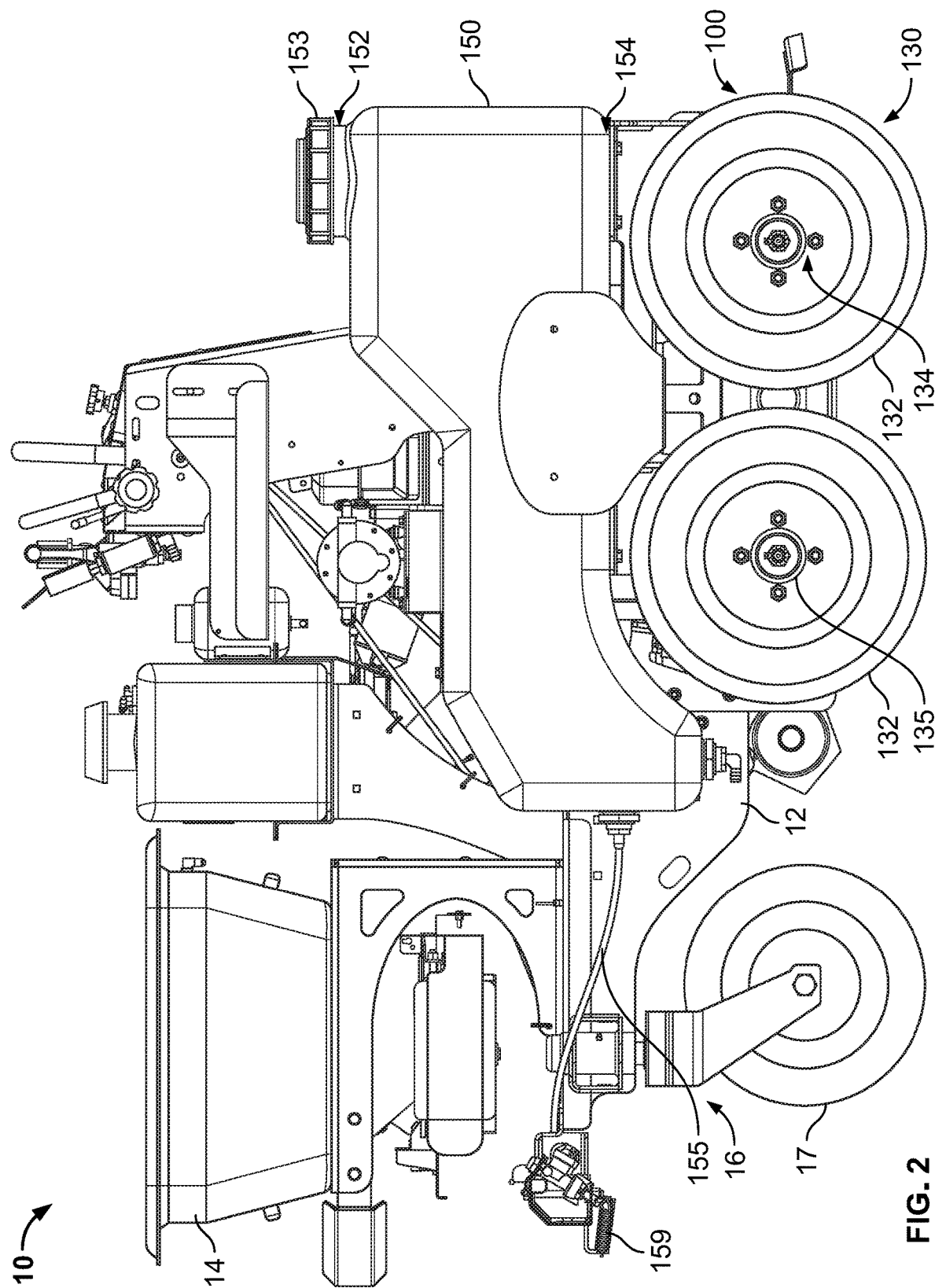
FIG. 2 illustrates a side elevation view of the example spreader sprayer system of FIG. 1 in accordance with various embodiments.
Figure 3:
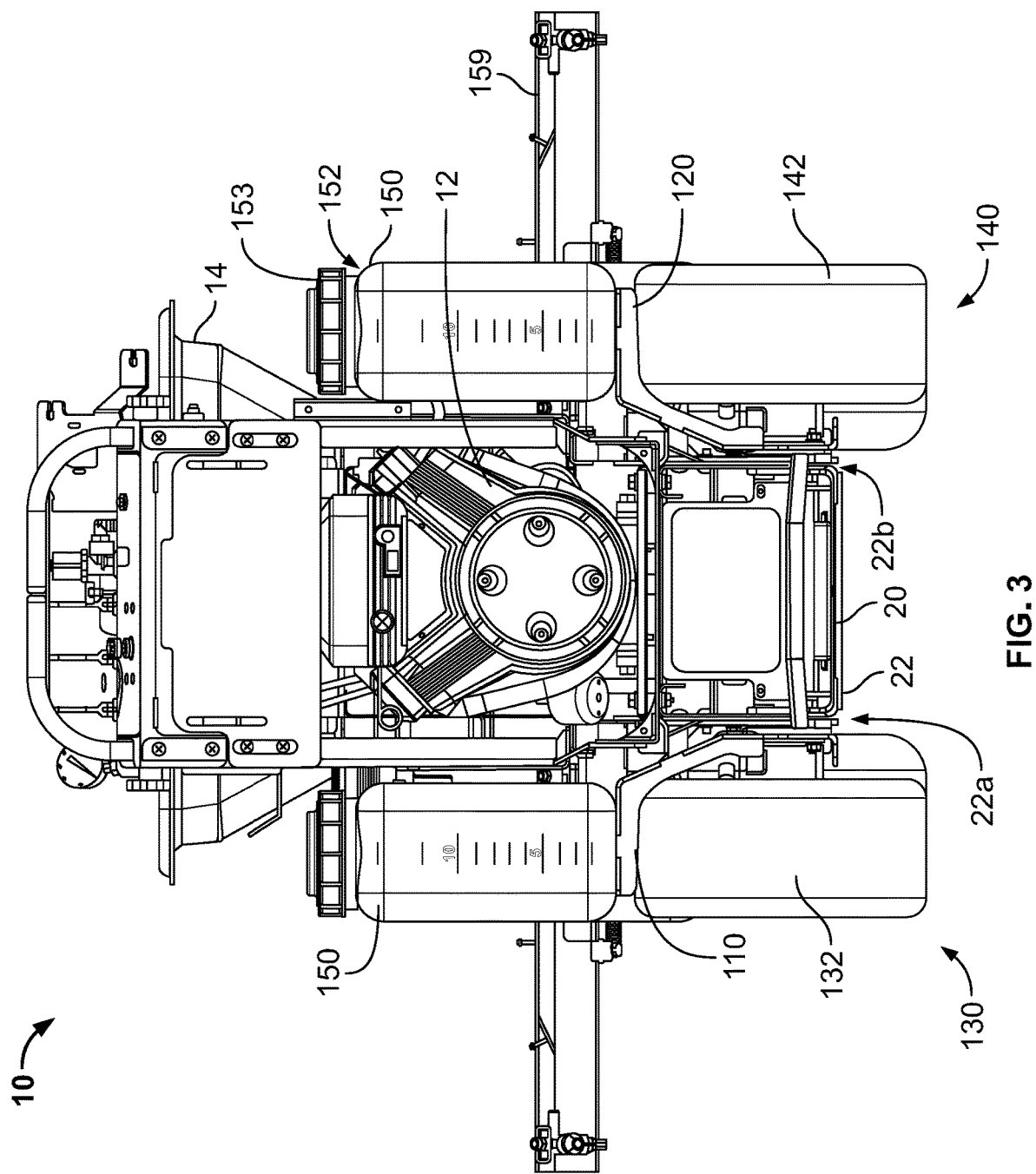
FIG. 3 illustrates a rear elevation view of the example spreader sprayer system of FIGS. 1 and 2 in accordance with various embodiments.
Figure 4:
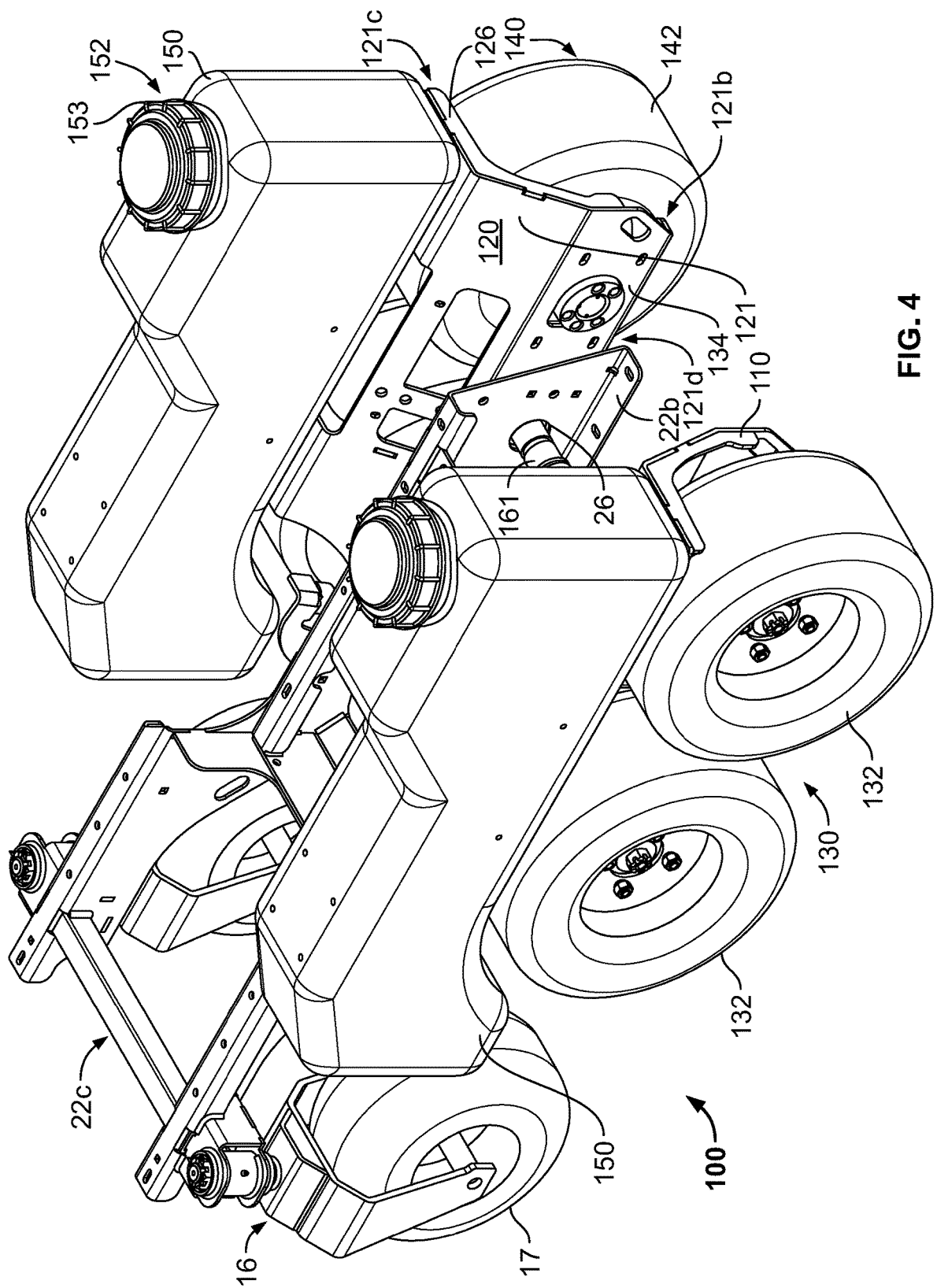
FIG. 4 illustrates a perspective view of an example walking beam assembly in accordance with various embodiments.

The spray container or containers 150 are in the form of a generally hollow structure to accommodate a liquid fertilizer. The spray container or containers 150 may have an opening 152 that is sealable by a cap 153, a mounting portion 154, and any additional features such as visual fertilizer level indicators, fluid outlets, and the like. In the illustrated example, a first spray container 150 is mounted to the first walking member body 111, and a second spray container 150 is mounted to the second walking member body 121. Specifically, a portion of the first spray container 150 may rest on the flange or plate portion 116 and may be mounted thereto at the mounting portion 154 via any number of approaches such as bolts or other fasteners. Accordingly, the mounting portion 154 may be in the form of threaded holes to accommodate bolts that are inserted through mounting holes formed in the flange or plate portion 116. In other examples, the mounting portion 154 may be in the form of a groove that slidably engages the flange or plate portion 116. Other examples are possible. The spreader sprayer 10 may additionally include piping or tubing 155 that fluidly couples the spray containers 150 to a sprayer system 159 (illustrated in FIGS. 1-3) that releases the liquid fertilizer in any number of desired flow patterns at specified flow rates.

Figure 7:
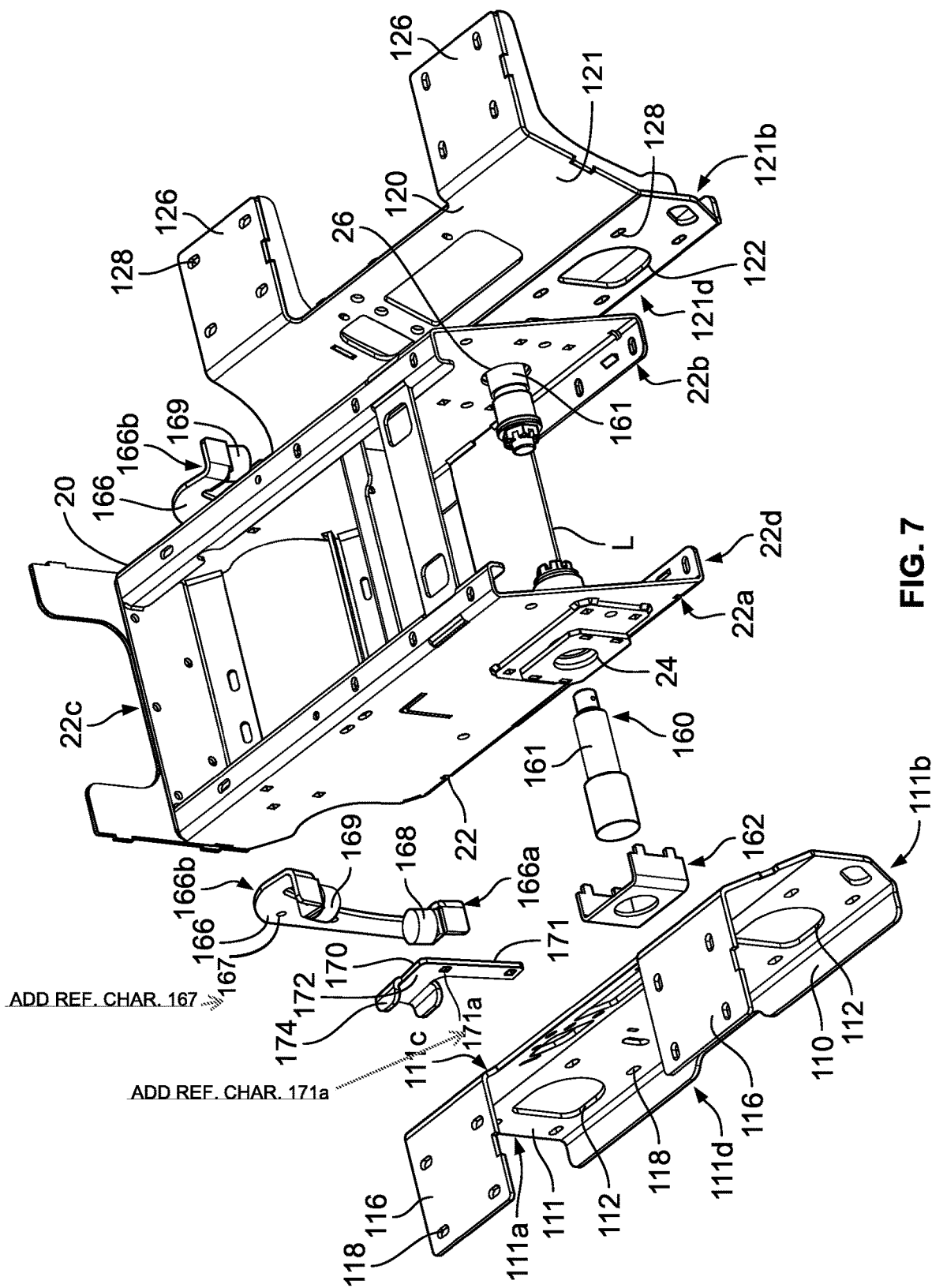
FIG. 7 illustrates a top rear-side exploded perspective view of the example walking beam assembly of FIGS. 4-6 in accordance with various embodiments.
Figure 8:
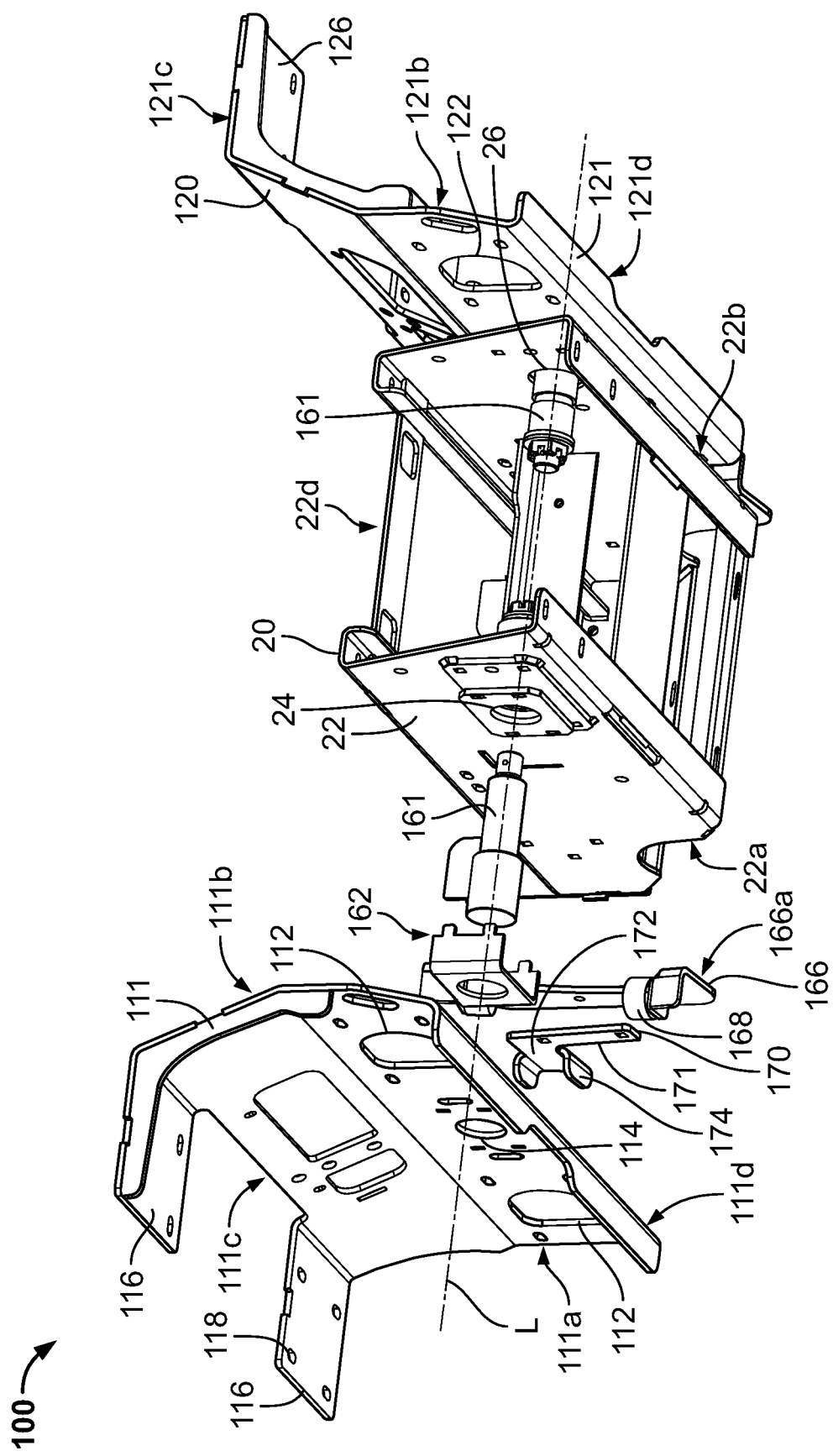
FIG. 8 illustrates a bottom rear-side exploded perspective view of the example walking beam assembly of FIGS. 4-7 in accordance with various embodiments.
Figure 9:
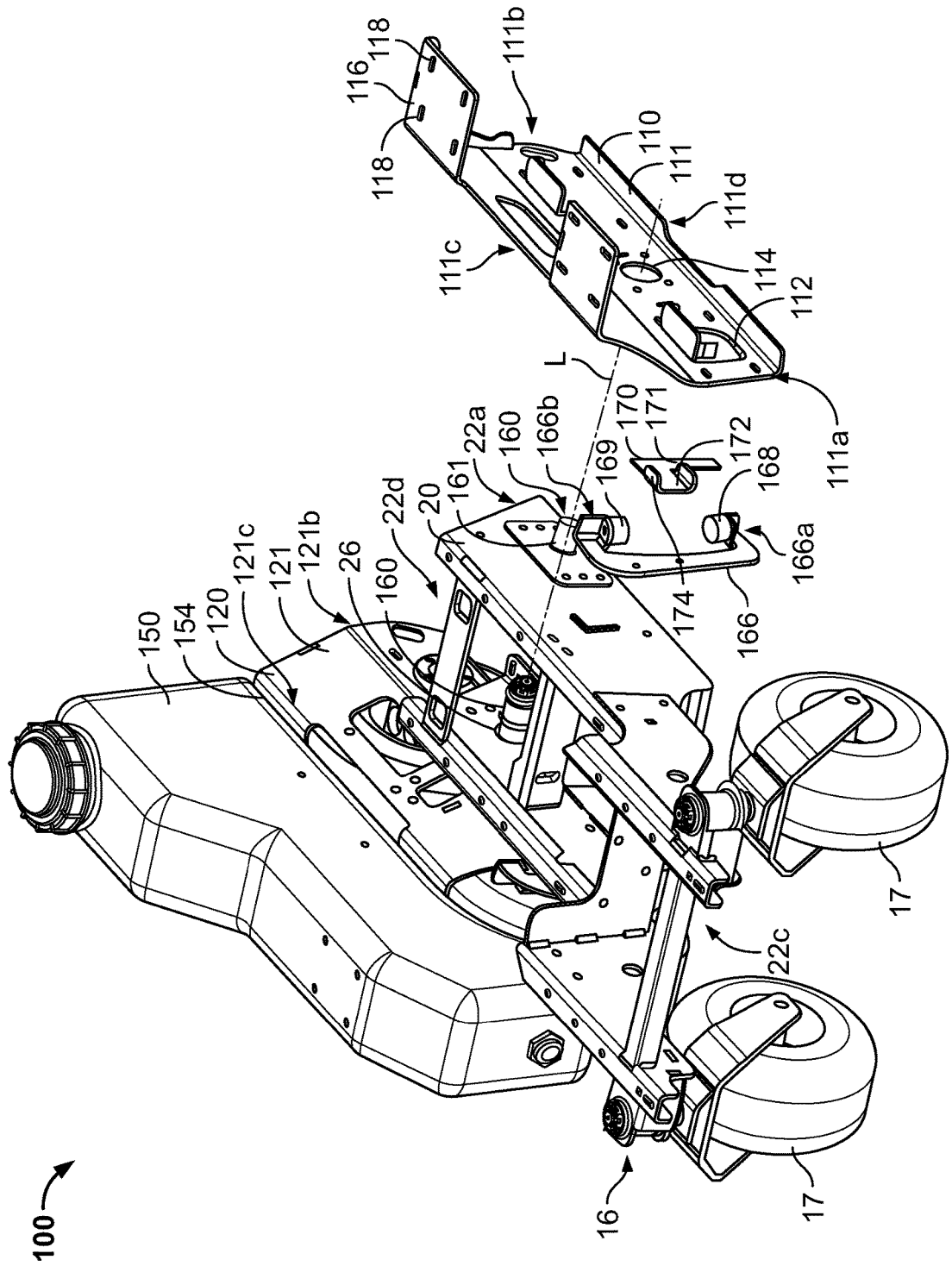
FIG. 9 illustrates a front top-side exploded perspective view of the example walking beam assembly of FIGS. 4-8 having a rotation limiter in accordance with various embodiments.
Figure 10:
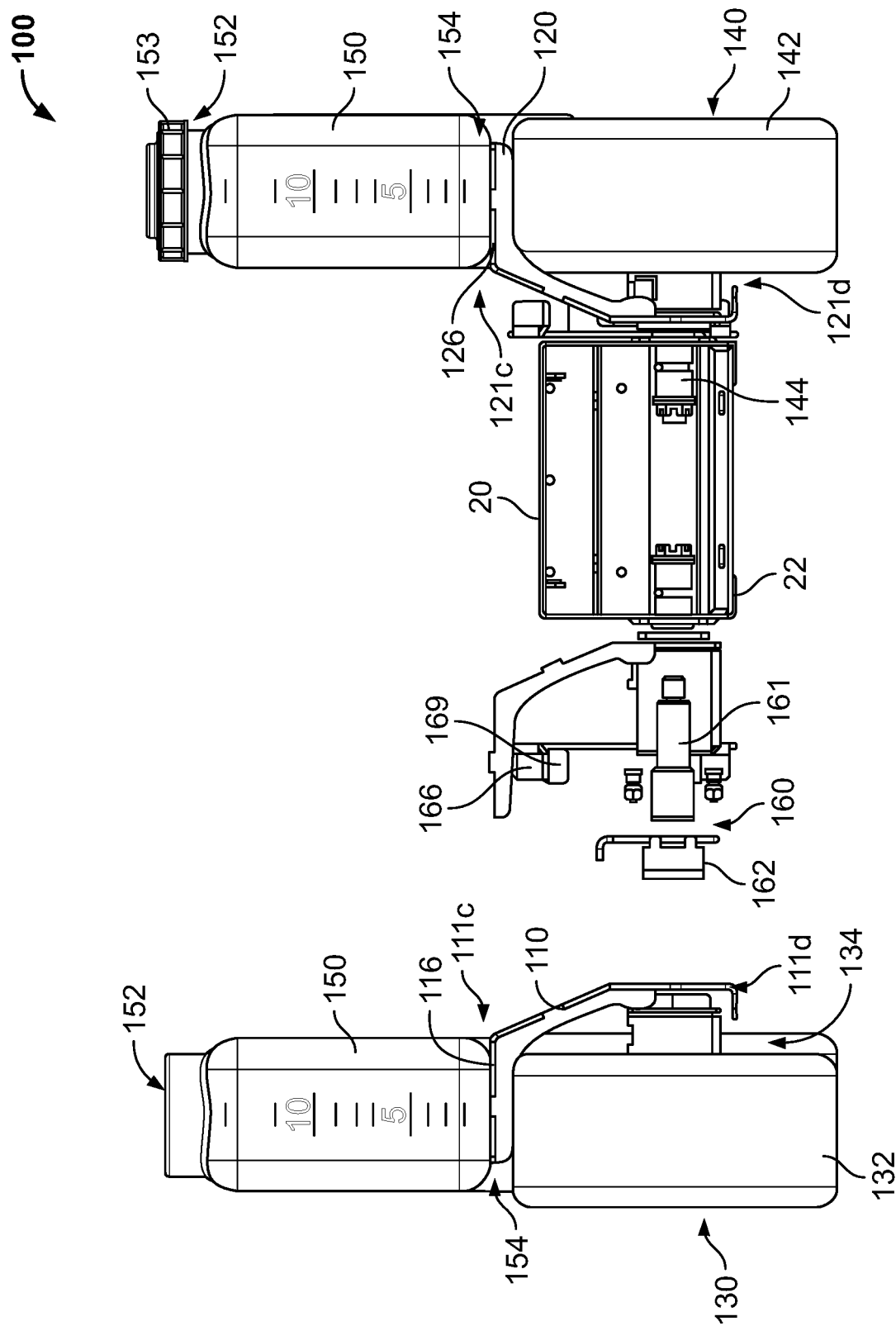
FIG. 10 illustrates a partially exploded rear elevation view of the example walking beam assembly of FIGS. 4-9 in accordance with various embodiments.

As mentioned, each of the first and the second walking members 110, 120 are rotatably coupled to the frame member 20. Specifically, the plurality of walking axle assemblies 160 include a walking axle 161, a coupling mechanism 162 in the form of a hub having openings to accommodate a number of bolts, and any number of additional components such as bearings, bushings, sleeves, brackets, bolts, and the like. As illustrated in FIGS. 7 and 8, the first and the second pivotable connection regions 24, 26 of the frame member 20 and the pivot openings 114, 124 of the first and second walking members 110, 120 are axially aligned along the pivot axis L (FIG. 7). Accordingly, the first and the second walking members 110, 120 may be rotatably coupled to the frame member 20 by inserting a first walking axle 161 through the first pivotable connection region 24 and the pivot opening 114 and securing the first walking axle 161 to the first walking member 110 and the frame member 20 via the coupling mechanism 162; and further inserting a second walking axle 161 through the second pivotable connection region 26 and the pivot opening 124 and securing the second walking axle 161 to the second walking member 120 and the frame member 20 via a second coupling mechanism 162. As a result, the first walking member 110 may be rotatable relative to the frame member 20, the second walking member 120 may be rotatable relative to the frame member 20, and further, the first and second walking members 110, 120 may be rotatable relative to each other. It will be appreciated that in some examples, the first pivotable connection region 24 may not be axially aligned with the second pivotable connection region 26 and instead may be axially offset therefrom.

In some examples, the spreader sprayer 10 may use a single walking axle that couples both the first and the second walking members 110, 120 to the frame member 20. In any event, each of the walking members 110, 120 may rotate freely relative to the frame member 20. In some configurations where a single walking axle is used, the first walking member and the second walking member 110, 120 may each be coupled to the walking axle in a manner that restricts relative movement therebetween.

The spreader sprayer 10 may include any number of rotation limiters 166 (FIG. 7) adapted to limit relative rotation between the first and second walking members 110, 120 and the frame member 20. In the illustrated example, the rotation limiter 166 is in the form of an elongated bracket having a first end 166a, a second end 166b, and any number of mounting holes 167 that are sized and configured to accommodate the mounting structures formed on the frame member 20. In the illustrated example, a first rotation limiter 166 is mounted to the first side 22a of the frame body 22 and a second rotation limiter 166 is mounted to the second side 22b of the frame body 22. In other examples, the rotation limiters 166 may be integrally formed with the frame body 22.

Each of the rotation limiters 166 includes a first stopper or limiter 168 positioned near the first end 166a and a second stopper or limiter 169 positioned near the second end 166b. The first and the second stoppers or limiters 168, 169 may be constructed from any number of materials such as, for example, rubber or other resilient materials capable of at least partially absorbing impacts. In other approaches, the first and the second stoppers or limiters 168, 169 may be constructed from a rigid or semi-rigid material. As will be discussed, the distance between the first and second stopper or limiters 168, 169 corresponds to the overall allowable rotational distance of the walking members 110, 120 relative to the frame member 20.

Coupled to each of the first and the second walking members 110, 120 is a stop tab 170 that selectively engages the rotation limiter 166. The stop tab 170 may be in the form of an L-shaped bracket having a mounting portion 171 and an engagement portion 172. The mounting portion 171 may have any number of mounting holes 171a that are sized and configured to accommodate the mounting portions 118, 128 formed on the walking members 110, 120. In some examples, the stop tab 170 may be integrally formed with each of the walking members 110, 120. The engagement portion 172 includes any number of protrusions or ledges 174 that are adapted to be disposed in the gap between the first stopper or limiter 168 and the second stopper or limiter 169.

Because the walking members 110, 120 rotate relative to the frame body 22, each of the stop tabs 170, which are coupled to the walking members 110, 120, rotate relative to the rotation limiters 166, which are coupled to the frame body 22. As a result, upon the relative angle of rotation between the walking members 110, 120 and the frame body 22 exceeding a predetermined value, the protrusion or ledge 174 will engage one of the stopper or limiters 168, 169 and restrict the walking members 110, 120 from further rotation relative to the frame member 20. The first and the second stoppers or limiters 168, 169 may be spaced apart to allow for the first and the second walking members 110, 120 to rotate between approximately 5° from a horizontal plane and approximately 60° from a horizontal plane in either direction. Other examples are possible.

In the illustrated example, because the wheels 17 are operatively coupled to the frame member 20 via the turning assembly 16, these wheels 17 limit rotation of the frame member relative to the ground. Further, when the spreader sprayer 10 is positioned on a flat and level surface, the protrusion or ledge 174 is adapted to be positioned a distance away from both the first and the second stoppers or limiters 168, 169, thereby allowing the walking members 110, 120 to rotate in either an upward or a downward direction depending on the grade of the terrain being traversed.

Advantageously, by allowing the walking beam assemblies 110, 120 to rotate relative to the frame member 20, stability of the spreader sprayer 10 is improved and thereby increases user comfort while reducing the risk of accidents. Further, by coupling the spray containers 150 to the walking beam assemblies 110, 120, less clearance between the wheels and tanks is needed, thus resulting in a lower center of gravity for the spreader sprayer 10. Such a configuration allows for larger spray containers 150 to be used, thereby increasing their storage capacity which reduces downtime necessary to refill the spray containers 150. Additionally, these larger containers 150 may require less tubing 155 to couple the sprayer system 159, and as a result, the liquid fertilizer may have a shorter distance to travel to the sprayer system 159 which may result in increased fluid flow and sprayer performance. Further, the walking beam assemblies 110, 120, when used in conjunction with the drive wheel assemblies 130, 140 having multiple wheels 132, 142, result in reduced ground pressure because the additional wheels 132, 142 support the weight of the spreader sprayer 10.

Unless specified otherwise, any of the feature or characteristics of any one of the embodiments of the spreader sprayer machine disclosed herein may be combined with the features or characteristics of any other embodiments of the spreader sprayer machine.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to spreader sprayer functionality, and improve the functioning of conventional spreader sprayer mechanisms.

What is claimed is:

1. A spreader sprayer system comprising:
a frame member defining a frame body having a first side, a second side, a front portion, and a rear portion;
a first walking member pivotably coupled to the first side of the frame body;
a second walking member pivotably coupled to the second side of the frame body;
a first drive wheel assembly disposed on the first side of the frame body and being operatively coupled to the first walking member;
a second drive wheel assembly disposed on the second side of the frame body and being operatively coupled to the second walking member; and
at least one spray container coupled to at least one of the first walking member or the second walking member such that the at least one spray container rotates therewith.

2. The spreader sprayer system of claim 1, further comprising a first pivotable connection region disposed on the first side of the frame body and a second pivotable connection region disposed on the second side of the frame body, wherein the first and second pivotable connection regions are adapted to provide relative rotation between the frame body, the first walking member, and the second walking member.

3. The spreader sprayer system of claim 2, further comprising a first rotation limiter disposed on the first side of the frame member, the first rotation limiter selectively engaging the first walking member to limit relative rotation between the frame member and the first walking member.

4. The spreader sprayer system of claim 3, further comprising a second rotation limiter disposed on the second side of the frame member, the second rotation limiter selectively engaging the second walking member to limit relative rotation between the frame member and the second walking member.

5. The spreader sprayer system of claim 3, further comprising a stop tab coupled to the first walking member, wherein the stop tab is adapted to engage the first rotation limiter to limit relative rotation between the frame member and the first walking member.

6. The spreader sprayer system of claim 5, wherein when the spreader sprayer system is disposed on a generally horizontal surface, the stop tab is disposed away from the first rotation limiter.

7. The spreader sprayer system of claim 1, wherein the first drive wheel assembly comprises a plurality of drive wheels that are operatively connected to each other such that the first plurality of drive wheels are driven at an identical rate of rotation.

8. The spreader sprayer system of claim 7, wherein the first drive wheel assembly is driven by a motor.

9. The spreader sprayer system of claim 1, further comprising a standing platform operatively coupled to the rear portion of the frame body.

10. The spreader sprayer system of claim 1, further comprising a spreader container operatively coupled to the front portion of the frame body.

11. A walking beam assembly for a spreader sprayer system, the walking beam assembly including:
a first walking member having a first rotatable coupling;
a first plurality of drive wheels being operatively coupled to the first walking member; and
a first spray container coupled to the first walking member such that the first spray container rotates with the first walking member about the first rotatable coupling.

12. The walking beam assembly of claim 11, further comprising:
a second walking member having a second rotatable coupling;
a second plurality of drive wheels being operatively coupled to the second walking member; and
a second spray container coupled to the second walking member such that the second spray container rotates with the second walking member about the second rotatable coupling.

13. The walking beam assembly of claim 11, further comprising a stop tab coupled to the first walking member to engage an object, thereby stopping rotation of the first walking member about the first rotatable coupling.

14. The walking beam assembly of claim 11, wherein the first plurality of drive wheels are operatively connected to each other such that the first plurality of drive wheels are driven at an identical rate of rotation.

15. The walking beam assembly of claim 14, wherein the first plurality of drive wheels are driven by a motor.

* * * * *